United States Patent
Kim et al.

(10) Patent No.: US 7,383,558 B2
(45) Date of Patent: Jun. 3, 2008

(54) VIBRATION PREVENTING DEVICE AND AN OPTICAL DISC DRIVE HAVING THE SAME

(75) Inventors: Tae-myun Kim, Yongin-si (KR); Chan-bum Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 323 days.

(21) Appl. No.: 11/049,970

(22) Filed: Feb. 4, 2005

(65) Prior Publication Data

US 2006/0020957 A1    Jan. 26, 2006

(30) Foreign Application Priority Data

Jul. 23, 2004    (KR)    ............. 10-2004-0057761

(51) Int. Cl.
*G11B 7/08* (2006.01)

(52) U.S. Cl. .................................... 720/692

(58) Field of Classification Search .............. 720/692, 720/651; 360/97.01; 361/685; 369/44.11
See application file for complete search history.

(56) References Cited

U.S. PATENT DOCUMENTS 6,002,658 A * 12/1999 Aso et al. .............. 720/651
6,219,315 B1 * 4/2001 Buchs et al. ............ 369/44.11
6,690,638 B1 * 2/2004 Kiyomiya et al. ........ 720/651
2002/0097556 A1 * 7/2002 Lee ........................ 361/685
2003/0058572 A1 * 3/2003 Kant et al. ............... 360/97.01

FOREIGN PATENT DOCUMENTS

| JP | 10-231893 | 9/1998 |
| JP | 11-166568 | 6/1999 |
| JP | 2003-139183 | 5/2003 |
| KR | 000017453 | 3/2000 |
| KR | 1020020037846 | 5/2002 |

* cited by examiner

*Primary Examiner*—Tianjie Chen
(74) *Attorney, Agent, or Firm*—Roylance, Abrams, Berdo & Goodman, L.L.P.

(57) ABSTRACT

An optical disc drive has an improved vibration preventing device. A main chassis has opposite sidewalls and first and second mold tension parts integrally formed with the sidewalls, respectively. A pickup deck has a turn table adapted to receive a disc and a pickup moving in a radial direction of the disc and mounted to the main chassis to move up and down. A sub chassis has first and second mold tension guide parts mounted on a front of the pickup deck and supported by and under the first and the second mold tension parts. A disc tray moves inwardly and outwardly with respect to the main chassis. The mold tension guide parts of the sub chassis are elastically supported by the mold tension parts of the main chassis in an up-position of the pickup deck, thereby absorbing external impacts and inner vibrations.

13 Claims, 4 Drawing Sheets

VIBRATION PREVENTING DEVICE AND AN OPTICAL DISC DRIVE HAVING THE SAME

CROSS-REFERENCE TO RELATED APPLICATIONS

This application claims the benefit of Korean Patent Application No. 2004-57761, filed Jul. 23, 2004, in the Korean Intellectual Property Office, the entire disclosure of which is hereby incorporated by reference.

BACKGROUND OF THE INVENTION

1. Field of the Invention

The present invention relates to a vibration preventing device. More particularly, the present invention relates to a vibration preventing device for apparatuses such as a compact disc (CD) and a digital versatile disc (DVD) and an optical disc drive having the same.

2. Description of the Related Art

General optical disc drives record and reproduce information with respect to an optical recording medium, such as a compact disc (CD) and a digital versatile disc (DVD), using a non-contact type pickup unit. Therefore, the optical disc drives are excellent in repetitive data reproducing, however, their performances are subject to vibration.

In addition, as the speeds of the optical disc drives are getting faster, prevention and restraint of vibration has become an increasingly important matter.

FIG. 1 illustrates an optical disc drive applying a general vibration preventing device.

As shown in FIG. 1, the general optical disc drive includes a main chassis 10 and a pickup deck 20 mounted to the main chassis 10, which is adapted to move vertically. The pickup deck 20 also has a turn table 21 to receive a disc and a pickup 22 that moves near to and away from the disc received in the turn table 20 in a radial motion to record and reproduce information. A disc tray 30 mounted to the main chassis 10 moves in and out with respect to the main chassis 10. A vibration preventing device 40 is disposed between the pickup deck 20 and the main chassis 10 to prevent vibrations from external agitation and noise from inner vibration while an eccentric disc is driven.

The vibration preventing device 40 includes three vibration preventing members 41, 42 and 43 respectively disposed on opposite sides of a front portion and on a rear portion of the pickup deck 20. Typically, the vibration preventing members 41, 42 and 43 are made of rubber.

The vibration preventing members 41, 42 and 43 absorb shock between the pickup deck 20 and the main chassis 10. Although a user hits the set or puts a remote controller on the set, for example, vibration generated by such external agitation or an impact is not transmitted to the pickup deck 20. Also, the inner vibration generated when an eccentric disc is driven is not transmitted to the surroundings, and accordingly, errors can be prevented from occurring when the optical disc drive records or reproduces information.

However, the three vibration preventing members 41, 42 and 43 increases the manufacturing costs. Further, impurities, such as sulfur, are generated in the members 41, 42 and 43. These impurities may contaminate adjacent parts, such as a direct current (DC) motor 23 for driving the pickup 22, thereby causing breakdown of the parts.

SUMMARY OF THE INVENTION

An aspect of the present invention is to at least solve the above problems and/or disadvantages and to at least provide the advantages described below. Accordingly, an aspect of the present invention is to provide a vibration preventing device that may lower manufacturing costs by reducing the number of component parts and prevent contamination of adjacent parts caused by impurities, such as sulfur, by restraining the use of shock-absorbing rubber.

Another aspect of the present invention is to provide an optical disc drive having the above-described vibration preventing device.

In order to achieve the above-described aspects of the present invention, a vibration preventing device is disposed between a first member having opposite sidewalls and a second member mounted to the first member to vertically move in order to absorb vibration caused by an external impact. including A pair of mold tension parts are integrally formed with the sidewalls of the first member. A pair of mold tension guide parts project from opposite sides of a front of the second member, which are supported by and under the mold tension parts.

The vibration preventing device may further include a single vibration preventing member in the rear center of the second member.

The mold tension parts of the first member elastically press the mold tension guide parts of the second member in an up-position of the second member. This buffs an external impact and absorbs inner vibration, and therefore impacts and vibrations are not transmitted to the second member.

In order to achieve another aspect of the present invention, an optical disc drive has an improved vibration preventing device. A main chassis has opposite sidewalls and first and second mold tension parts integrally formed with the sidewalls, respectively. A pickup deck has a turn table for receiving a disc and a pickup moving in a radial direction of the disc and mounted to the main chassis to move up and down. A sub-chassis having first and second mold tension guide parts is mounted on a front of the pickup deck and supported by and under the first and the second mold tension parts. A disc tray moves in and out with respect to the main chassis. The mold tension guide parts of the sub chassis are elastically supported by the mold tension parts of the main chassis in an up-position of the pickup deck, thereby absorbing an external impact and inner vibration.

The optical disc drive may further include a single vibration preventing member in the rear center of the pickup deck.

In order to achieve yet another aspect of the present invention, an optical disc drive has a main chassis having opposite sidewalls. A pickup deck has a turn table for receiving a disc and a pickup moving in a radial direction of the disc and mounted to the main chassis to move up and down. A sub-chassis is mounted on a front of the pickup deck. A vibration preventing device is disposed between the pickup deck and the main chassis to prevent a vibration from external agitation and noise from inner vibrations while an eccentric disc is driven. The vibration preventing device has first and second mold tension parts integrally formed with the sidewalls of the main chassis. First and second mold tension guide parts are formed at the sub-chassis to be supported by and under the first and the second mold tension parts. The mold tension guide parts of the sub chassis are elastically supported by the mold tension parts of the main chassis in an up-position of the pickup deck, thereby absorbing an external impact and inner vibration.

Other objects, advantages and salient features of the invention will become apparent from the following detailed description, which, taken in conjunction with the annexed drawings, discloses exemplary embodiments of the invention.

BRIEF DESCRIPTION OF THE DRAWING FIGURES

The above aspect and other features of the present invention will become more apparent by describing in detail exemplary embodiments thereof with reference to the attached drawing figures, wherein.

Throughout the drawings like reference numbers shall be understood to refer to like elements, features and structures.

DETAILED DESCRIPTION OF THE EXEMPLARY EMBODIMENTS

Hereinafter, embodiments of the present invention will be described in detail with reference to the accompanying drawing figures.

The matters defined in the description, such as a detailed construction and elements, are provided to assist in a comprehensive understanding of the invention. Thus, it is apparent that the various changes and modifications to the embodiments described herein may be made without departing from the spirit and scope of the present invention. Also, depictions of well-known functions or constructions omitted for the sake of clarity.

Figure 1:
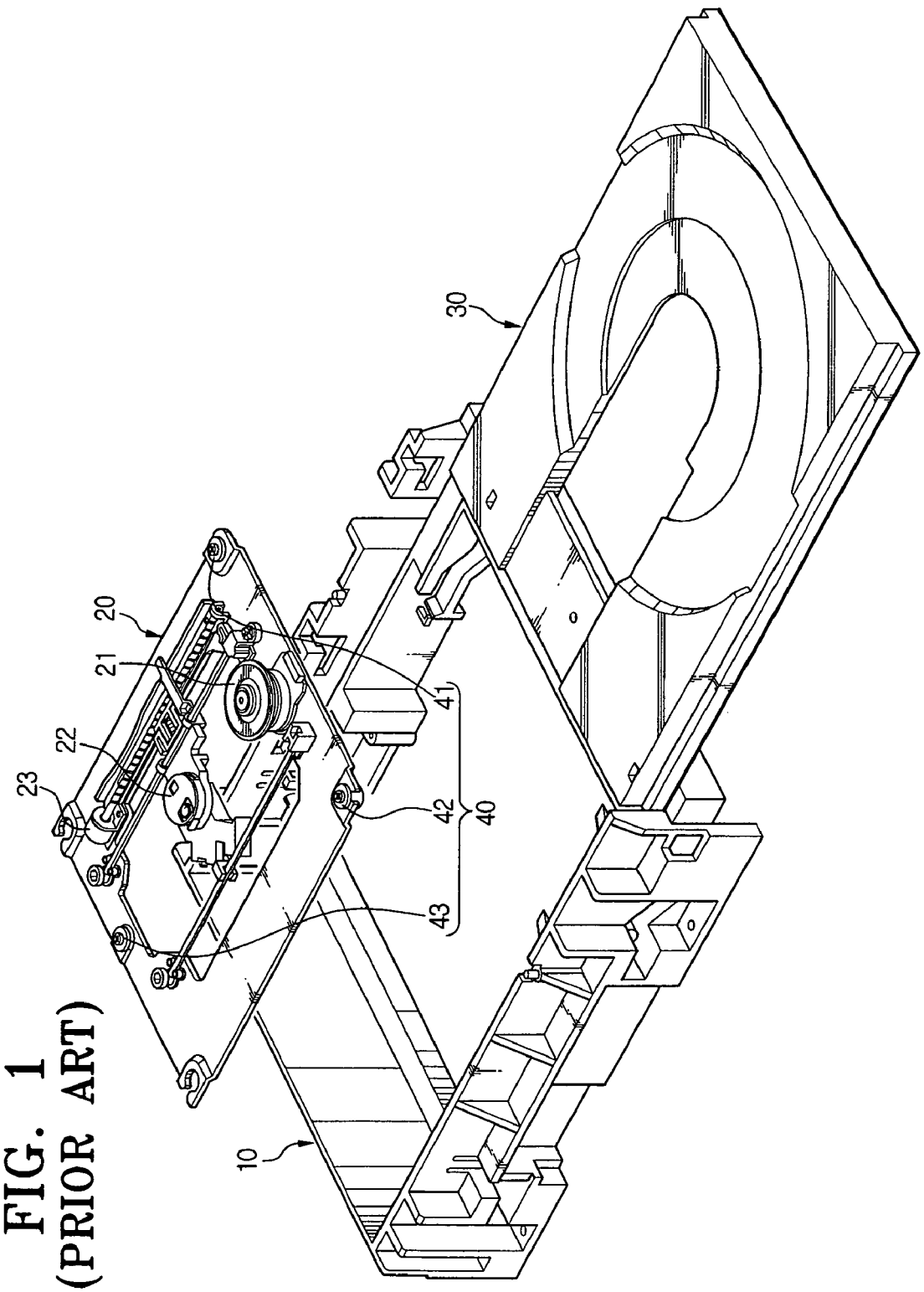
FIG. 1 is an exploded perspective view of a prior art optical disc drive employing a conventional vibration preventing device.
Figure 2:
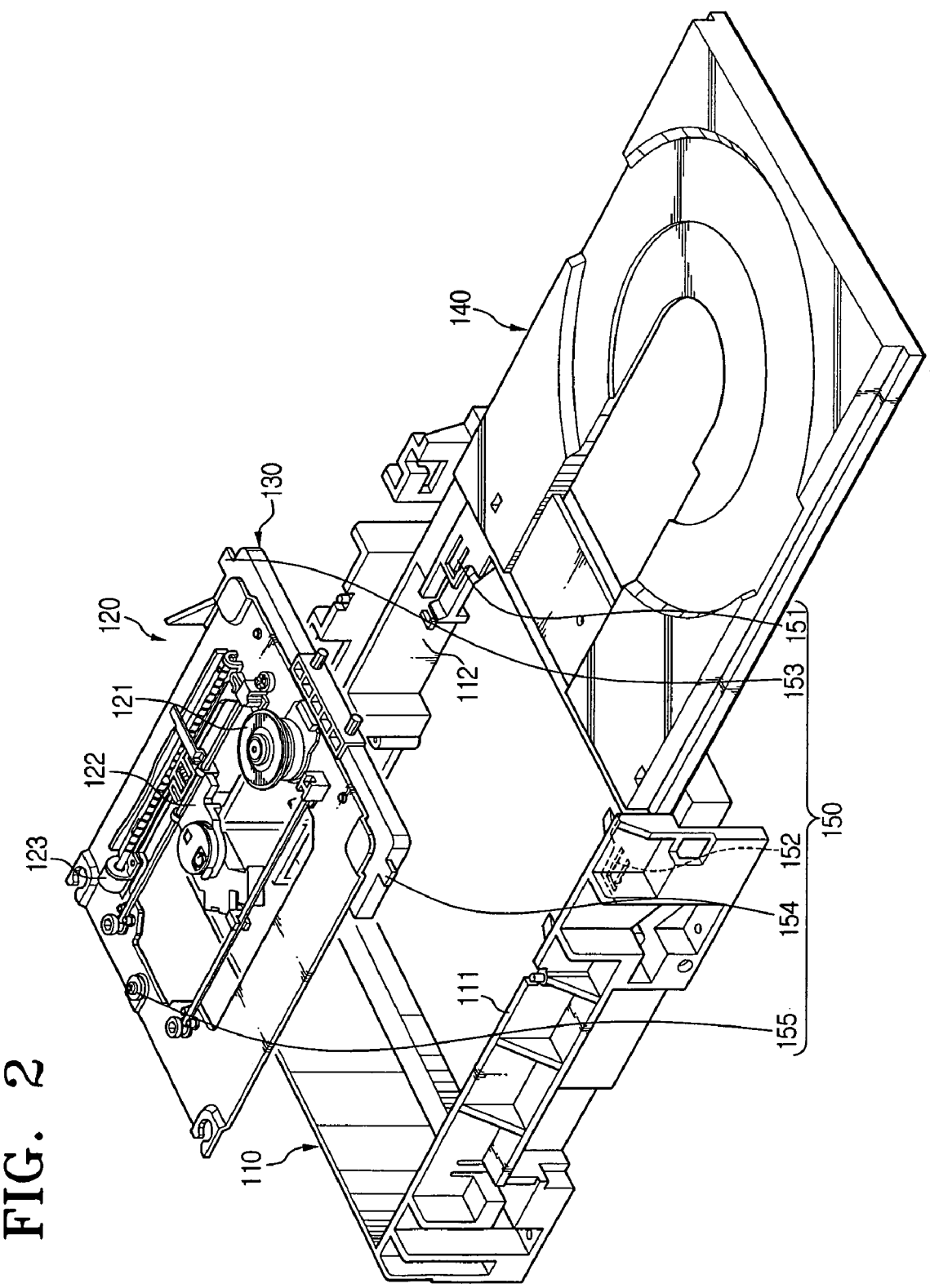
FIG. 2 is an exploded perspective view of an optical disc drive employing a vibration preventing device according to an embodiment of the present invention.
Figure 3:
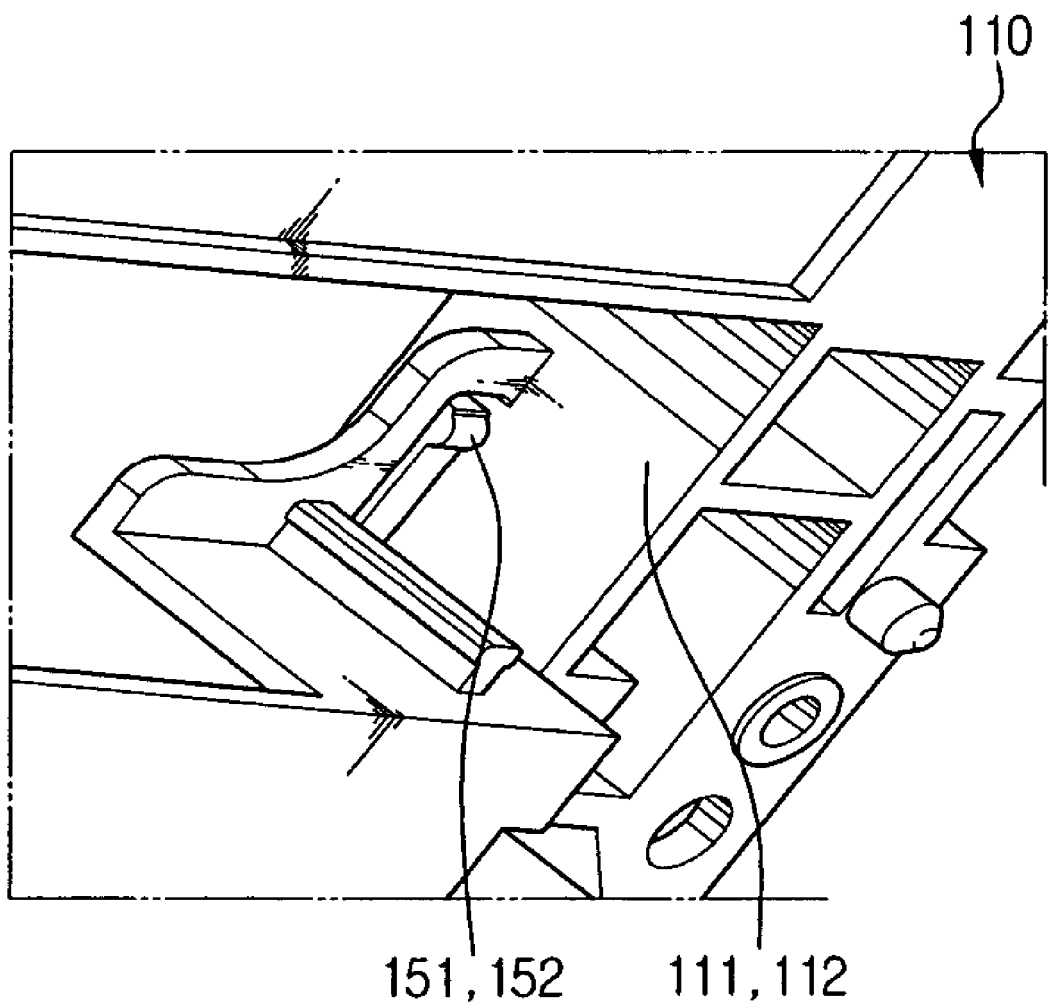
FIG. 3 is a detailed view of main parts of FIG. 2.
Figure 4:
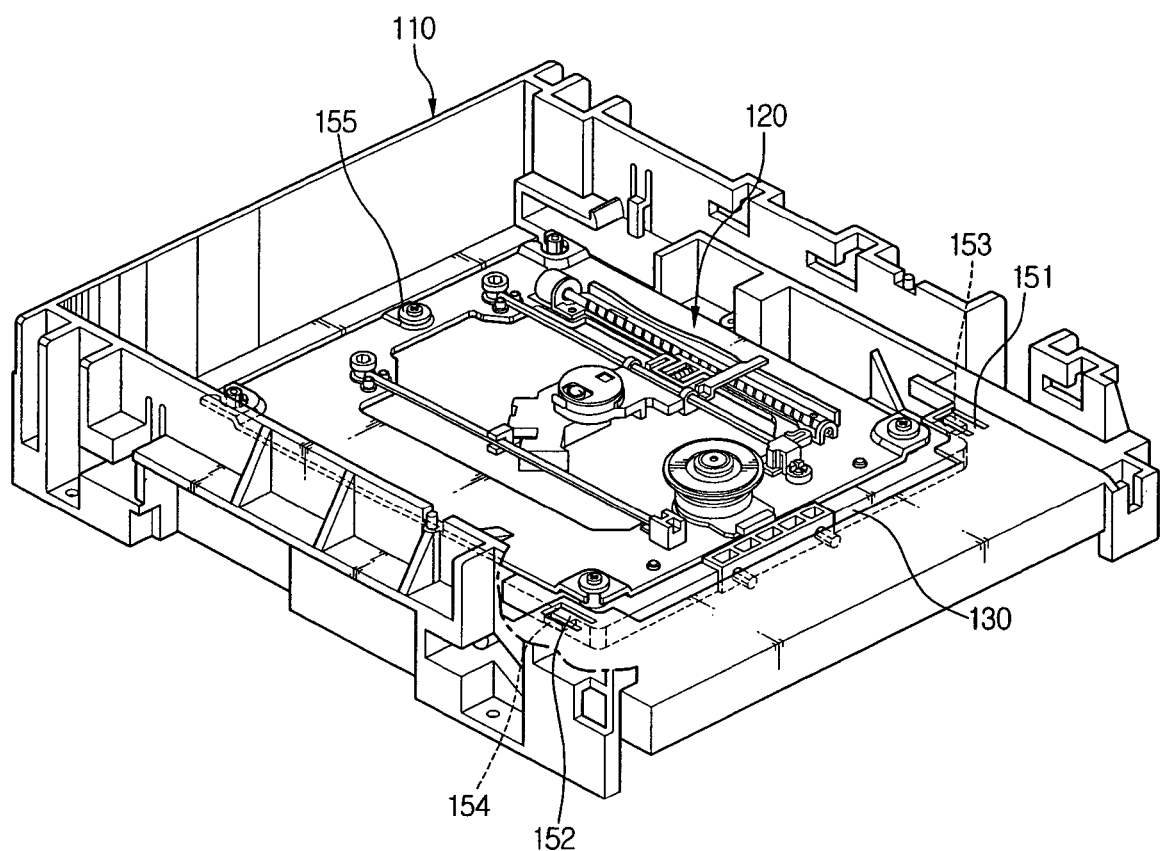
FIG. 4 is a perspective view showing an assembled state of FIG. 2.

Referring to FIGS. 2 to 4, an optical disc drive having an improved vibration preventing device according to an embodiment of the present invention includes a main chassis 110, a pickup deck 120, a sub chassis 130, a disc tray 140 and a vibration preventing device 150 disposed between the pickup deck 120 and the main chassis 110 to prevent a vibration from external agitation and noise from inner vibration while an eccentric disc is driven.

The main chassis 110 has sidewalls 111 and 112 and receives and supports the pickup deck 120 and the disc tray 140, which will be described below.

The pickup deck 120 includes a turn table 121 adapted to receive a disc, a pickup 122 that moves in a radial direction of the disc being rotated in the turn table 121 to record and reproduce information. A direct current (DC) motor 123 drives the pickup 122. The pickup deck 120 is mounted to the main chassis 110 and is adapted to move up and down. An up-position of the pickup deck 120 refers to a disc-chucking position.

The sub chassis 130 is mounted on a front of the pickup deck 120 to vertically move the pickup deck 120. A loading mechanism (not shown) of the sub chassis 130 and the main chassis 110 allows the disc to be loaded in the disc tray 140, and to then lift the main deck 120 up. Accordingly, the disc is received in the turn table 121.

The disc tray 140 is mounted to the main chassis 110 and is adapted to move outwardly and inwardly with respect to the main chassis. The disc is loaded to and unloaded from the main chassis 110 by the disc tray 140.

The vibration preventing device 150 may include first and second mold tension parts 151 and 152 integrally formed with the sidewalls 111 and 112 of the main chassis 110. First and second mold tension guide parts 153 and 154 are supported by and under the first and second mold tension parts 151 and 152 and integrally formed with the sub chassis 130. A single vibration preventing member 155 is disposed approximately in the center on an upper surface of the rear side of the pickup deck 120, which is structured in the same way as a conventional pickup deck. Preferably, the vibration preventing member is made of rubber.

While a conventional vibration preventing device has three vibration preventing members, the vibration preventing device according to an embodiment of the present invention includes one vibration preventing member 155, the mold tension parts 151 and 152 integrally formed with the main chassis 110, and the mold tension guide parts 153 and 154 integrally formed with the sub chassis 130. As a result, the number of component parts may be reduced, thereby reducing material costs. Moreover, contamination of adjacent parts due to sulfur may be prevented by reducing the number of the vibration preventing members used in the conventional art.

The first and the second mold tension guide parts 153 and 154 of the sub chassis 130 are elastically supported by the mold tension parts 151 and 152 of the main chassis 110 in the up-position of the pickup deck 120, that is, the disc-chucking position. External impacts or inner vibrations are absorbed by the mold tension parts 151 and 152 before reaching the pickup deck 120. Also, the inner vibrations or noises generated when the eccentric disc is being driven may be substantially eliminated by the mold tension parts 151 and 152, and prevented from spreading through the pickup deck.

Meanwhile, in the above-structured vibration preventing device according to an embodiment of the present invention, the single vibration preventing member 155 supplements the operation of the first and the second mold tension parts 151 and 152 and the first and the second mold tension guide parts 153 and 154, as well as minimizing side effects associated with reducing the number of vibration preventing members.

Additionally, the vibration preventing member 155 may be used as a hinge point for vertical movement of the pickup deck 120 and minimize an impact on the deck during a vibration/falling experiment.

As will be appreciated from the above description, by replacing the three vibration preventing members of the conventional vibration preventing device with the mold tension parts 151 and 152 and the mold tension guide parts 153 and 154 integrally formed with the main chassis 110 and the sub chassis 130, respectively, material costs are saved and contamination by impurities generated in the members, such as sulfur, may be prevented.

While the invention has been shown and described with reference to certain embodiments thereof, it will be understood by those skilled in the art that various changes in form and details may be made therein without departing from the spirit and scope of the invention as defined by the appended claims.

What is claimed is:

1. A vibration preventing device disposed between a first member having opposite sidewalls and a second member mounted to the first member and adapted to move vertically to absorb vibrations caused by external impacts, comprising:
   a pair of mold tension parts unitarily formed with the sidewalls of the first member as a single member; and
   a pair of mold tension guide parts projected on opposite sides of a front of the second member and supported by and under the pair of mold tension parts.

2. The vibration preventing device of claim 1, wherein a single vibration preventing member is disposed approximately in a rear center of the second member.

3. The vibration preventing device of claim 2, wherein the first member includes a main chassis of an optical disc drive, and the second member includes a pickup deck having a turn table and a pickup.

4. The vibration preventing device of claim 3, wherein the single vibration preventing member is disposed on an upper surface of the pickup deck.

5. The vibration preventing device of claim 1, wherein the pair of mold tension parts of the first member elastically press the pair of mold tension guide parts of the second member in an up-position of the second member.

6. The vibration preventing device of claim 1, wherein the pair of mold tension guide parts is integrally formed with the second member.

7. An optical disc drive, comprising:
a main chassis having opposite sidewalls and first and second mold tension parts integrally formed with the sidewalls, respectively;
a pickup deck having a turn table adapted to receive a disc, and a pickup moving in a radial direction of the disc and mounted to the main chassis and adapted to move up and down;
a sub chassis having first and second mold tension guide parts mounted on a front of the pickup deck and supported by and under the first and the second mold tension parts;
a disc tray moving in and out with respect to the main chassis, and
wherein the mold tension guide parts of the sub chassis are elastically supported by the mold tension parts of the main chassis in an up-position of the pickup deck to absorb an external impact and inner vibration.

8. The optical disc drive of claim 7, wherein a single vibration preventing member is disposed approximately in a rear center of the pickup deck.

9. The optical disc drive of claim 7, wherein a single vibration preventing member is disposed on an upper surface of the pickup deck.

10. An optical disc drive, comprising:
a main chassis having opposite sidewalls;
a pickup deck having a turn table adapted to receive a disc and a pickup moving in a radial direction of the disc and mounted to the main chassis and adapted to move up and down;
a sub chassis mounted on a front of the pickup deck;
a vibration preventing device disposed between the pickup deck and the main chassis to prevent vibrations from external agitations and noise from inner vibrations while an eccentric disc is being driven, the vibration preventing device including
first and second mold tension parts integrally formed with the sidewalls of the main chassis;
first and second mold tension guide parts formed at the sub chassis to be supported by and under the first and the second mold tension parts, and
wherein the mold tension guide parts of the sub chassis are elastically supported by the mold tension parts of the main chassis in an up-position of the pickup deckto absorb external impacts and inner vibrations.

11. The optical disc drive of claim 10, wherein a single vibration preventing member is disposed approximately in a rear center of the pickup deck.

12. The optical disc drive of claim 11, wherein a disc tray is adapted to move inwardly and outwardly with respect to the main chassis.

13. The optical disc drive of claim 10, wherein a single vibration preventing member is disposed on an upper surface of the pickup deck.

* * * * *